(12) United States Patent
Marking

(10) Patent No.: US 11,519,477 B2
(45) Date of Patent: Dec. 6, 2022

(54) COMPRESSION ISOLATOR FOR A SUSPENSION DAMPER

(71) Applicant: Fox Factory, Inc., Duluth, GA (US)

(72) Inventor: John Marking, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 16/553,030

(22) Filed: Aug. 27, 2019

(65) Prior Publication Data

US 2019/0383349 A1 Dec. 19, 2019

Related U.S. Application Data

(63) Continuation of application No. 15/726,835, filed on Oct. 6, 2017, now Pat. No. 10,400,847, which is a continuation of application No. 15/180,250, filed on Jun. 13, 2016, now Pat. No. 9,784,333, which is a continuation of application No. 14/692,401, filed on Apr. 21, 2015, now Pat. No. 9,366,307, which is a continuation of application No. 13/226,230, filed on
(Continued)

(51) Int. Cl.
| | |
|---|---|
| *F16F 9/00* | (2006.01) |
| *F16F 9/512* | (2006.01) |
| *F16F 9/346* | (2006.01) |
| *F16F 9/06* | (2006.01) |
| *B60G 13/08* | (2006.01) |
| *F16F 9/48* | (2006.01) |
| *F16F 9/32* | (2006.01) |
| *F16F 9/34* | (2006.01) |

(52) U.S. Cl.
CPC .............. *F16F 9/512* (2013.01); *B60G 13/08* (2013.01); *F16F 9/065* (2013.01); *F16F 9/3235* (2013.01); *F16F 9/3405* (2013.01); *F16F 9/346* (2013.01); *F16F 9/48* (2013.01); *B60G 2202/24* (2013.01)

(58) Field of Classification Search
CPC ...... F16F 9/504; F16F 9/34; F16F 9/43; F16F 9/185; B60G 17/08
See application file for complete search history.

(56) References Cited

U.S. PATENT DOCUMENTS

| | | |
|---|---|---|
| 435,995 A | 9/1890 | Dunlop |
| 1,078,060 A | 11/1913 | Newman |
| (Continued) | | |

FOREIGN PATENT DOCUMENTS

| | | |
|---|---|---|
| DE | 3532292 A1 | 3/1987 |
| DE | 3709447 A1 | 10/1988 |
| (Continued) | | |

OTHER PUBLICATIONS

Electronic Translation of DE3709447A1.
(Continued)

*Primary Examiner* — Vishal R Sahni

(57) ABSTRACT

A method and apparatus for a damper. The damper comprises a fluid chamber having a piston dividing the chamber into a compression and rebound sides, a reservoir in fluid communication with the compression side of the chamber, and an isolator disposed between the compression side and the reservoir, whereby the isolator obstructs fluid flow between the compression side and the reservoir. In one embodiment, a bypass provides a fluid path between the compression side and the isolator.

20 Claims, 4 Drawing Sheets

Related U.S. Application Data

Sep. 6, 2011, now Pat. No. 9,038,791, which is a continuation-in-part of application No. 13/175,244, filed on Jul. 1, 2011, now Pat. No. 8,627,932, said application No. 13/226,230 is a continuation-in-part of application No. 13/010,697, filed on Jan. 20, 2011, now Pat. No. 8,857,580, said application No. 13/226,230 is a continuation-in-part of application No. 12/684,072, filed on Jan. 7, 2010, now abandoned.

(60) Provisional application No. 61/380,177, filed on Sep. 3, 2010, provisional application No. 61/361,127, filed on Jul. 2, 2010, provisional application No. 61/296,826, filed on Jan. 20, 2010, provisional application No. 61/143,152, filed on Jan. 7, 2009.

(56) References Cited

U.S. PATENT DOCUMENTS

| | | |
|---|---|---|
| 1,307,502 A | 6/1919 | Martin |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Ransom et al. |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Jankowski et al. |
| 3,981,204 A | 9/1976 | Starbard et al. |
| 3,986,118 A | 10/1976 | Madigan |
| 3,995,883 A | 12/1976 | Glaze |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,570,851 A | 2/1986 | Cirillo et al. |
| 4,572,317 A | 2/1986 | Isono et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,673,194 A | 6/1987 | Sugasawa |
| 4,696,489 A | 9/1987 | Fujishiro et al. |
| 4,709,779 A | 12/1987 | Takehara |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |

(56) References Cited

U.S. PATENT DOCUMENTS

| | | |
|---|---|---|
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,394 A | 6/1989 | Lemme et al. |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le |
| 5,152,547 A | 10/1992 | Davis |
| 5,161,653 A | 11/1992 | Hare |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A * | 11/1993 | Petek .................... F16F 9/532 188/315 |
| 5,263,559 A | 11/1993 | Mettner |
| 5,265,902 A | 11/1993 | Lewis |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,297,045 A | 3/1994 | Williams et al. |
| 5,307,907 A | 5/1994 | Nakamura et al. |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,396,973 A | 3/1995 | Schwemmer et al. |
| 5,398,787 A | 3/1995 | Woessner et al. |
| 5,413,196 A | 5/1995 | Forster |
| 5,467,280 A | 11/1995 | Kimura |
| 5,474,454 A | 12/1995 | Knapp et al. |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,566,794 A | 10/1996 | Wiard |
| 5,578,877 A | 11/1996 | Tiemann |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,179,098 B1 | 1/2001 | Hayakawa et al. |
| 6,196,555 B1 | 3/2001 | Gaibler |
| 6,199,669 B1 | 3/2001 | Huang et al. |

(56) References Cited

U.S. PATENT DOCUMENTS

| | | |
|---|---|---|
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 * | 10/2001 | Marking ............ F16F 9/0209 188/315 |
| 6,311,962 B1 | 11/2001 | Marking |
| 6,318,525 B1 | 11/2001 | Mignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,467,593 B1 | 10/2002 | Corradini et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,722,678 B2 | 4/2004 | McAndrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |

(56) References Cited

U.S. PATENT DOCUMENTS

| | | |
|---|---|---|
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Txtance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,400,847 B2 * | 9/2019 | Marking .............. F16F 9/3235 |
| 10,443,671 B2 | 10/2019 | Marking |
| 10,718,397 B2 | 7/2020 | Marking |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |

(56) References Cited

U.S. PATENT DOCUMENTS

| | | |
|---|---|---|
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0208687 A1 | 10/2004 | Sicz et al. |
| 2004/0220708 A1 | 11/2004 | Owen et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Moss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0289258 A1* | 12/2006 | Fox .......................... F16F 9/44 188/322.21 |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Planiei et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |

(56) References Cited

U.S. PATENT DOCUMENTS

| | | |
|---|---|---|
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Hamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0081171 A1 | 3/2015 | Ericksen et al. |
| 2015/0179062 A1 | 6/2015 | Ralston et al. |
| 2015/0197308 A1 | 7/2015 | Butora et al. |
| 2015/0291248 A1 | 10/2015 | Fukao et al. |
| 2016/0025178 A1 | 1/2016 | Kamakura et al. |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0222541 A1 | 8/2018 | Madau et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0032745 A1 | 1/2019 | Marking |

FOREIGN PATENT DOCUMENTS

| | | | |
|---|---|---|---|
| DE | 3711442 | A1 | 10/1988 |
| DE | 3738048 | A1 | 5/1989 |
| DE | 3924166 | C1 | 2/1991 |
| DE | 4029090 | A1 | 3/1992 |
| DE | 4406918 | A1 | 9/1994 |
| DE | 202004005229 | U1 | 8/2004 |
| DE | 10326675 | A1 | 12/2004 |
| DE | 102005025811 | A1 | 12/2006 |
| DE | 102007063365 | A1 | 7/2009 |
| DE | 202008015968 | U1 | 4/2010 |
| DE | 202010012738 | U1 | 12/2010 |
| EP | 207409 | A2 | 1/1987 |
| EP | 304801 | A2 | 3/1989 |
| EP | 552568 | A1 | 7/1993 |
| EP | 1050696 | A2 | 11/2000 |
| EP | 1138530 | A2 | 10/2001 |
| EP | 1188661 | A2 | 3/2002 |
| EP | 1241087 | A1 | 9/2002 |
| EP | 1355209 | A1 | 10/2003 |
| EP | 1394439 | A1 | 3/2004 |
| EP | 1449688 | A2 | 8/2004 |
| EP | 1623856 | A2 | 2/2006 |
| EP | 1757473 | A2 | 2/2007 |
| EP | 1825220 | A2 | 8/2007 |
| EP | 2103512 | A2 | 9/2009 |
| EP | 2189191 | A2 | 5/2010 |
| EP | 2248691 | A1 | 11/2010 |
| EP | 2357098 | A2 | 8/2011 |
| EP | 2410203 | A2 | 1/2012 |
| EP | 2479095 | A2 | 7/2012 |
| EP | 2495472 | A2 | 9/2012 |
| EP | 2357098 | B1 | 10/2014 |
| EP | 2848582 | A1 | 3/2015 |
| FR | 2432424 | A1 | 2/1980 |
| FR | 2529002 | A2 | 12/1983 |
| FR | 2617928 | A1 | 1/1989 |
| FR | 2952031 | A1 | 5/2011 |
| GB | 2104183 | A | 3/1983 |
| GB | 2159604 | A | 12/1985 |
| GB | 2180320 | A | 3/1987 |
| GB | 2289111 | A | 11/1995 |
| JP | 57173632 | A | 10/1982 |
| JP | 57173632 | U | 11/1982 |
| JP | 57182506 | A | 11/1982 |
| JP | 01106721 | A | 4/1989 |
| JP | H0193637 | A | 4/1989 |
| JP | H02168038 | A | 6/1990 |
| JP | H03113139 | A | 5/1991 |
| JP | 04203540 | A | 7/1992 |
| JP | 05149364 | A | 6/1993 |
| JP | 06101735 | A | 4/1994 |
| JP | 06185562 | A | 7/1994 |
| JP | H084818 | A | 1/1996 |
| JP | 2005119548 | A | 5/2005 |
| JP | 2005119549 | A | 5/2005 |
| JP | 2007302211 | A | 11/2007 |
| JP | 2008238921 | A | 10/2008 |
| KR | 20070076226 | A | 7/2007 |
| WO | 9840231 | A2 | 9/1998 |
| WO | 99/06231 | | 2/1999 |
| WO | 0027658 | A1 | 5/2000 |
| WO | 03070546 | A1 | 8/2003 |
| WO | 2007017739 | A2 | 2/2007 |
| WO | 2007117884 | A2 | 10/2007 |
| WO | 2008086605 | A1 | 7/2008 |
| WO | 2008114445 | A1 | 9/2008 |
| WO | 2013066159 | A1 | 5/2013 |

OTHER PUBLICATIONS

English language abstract for EP 0207409 (No. date).
U.S. Appl. No. 61/175,422, filed May 4, 2009, Mario Galasso et al., 17 Pages.
U.S. Appl. No. 61/302,070, filed Feb. 5, 2010, Mario Galasso et al., 39 Pages.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.

(56) References Cited

OTHER PUBLICATIONS

European Search Report, European Patent Application No. 14189773. 6, dated May 4, 2015, 4 Pages.
Grounds of Appeal, EP App. No. 11153607.4, Jun. 1, 2018, 28 Pages.
EP Search Report for European Application No. 15163428.4, dated Jul. 3, 2017, 7 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis For Claims Filed 23.01.15", European Patent Application No. 14189773.6, 2 Pages.
"Communication Re Oral Proceedings for European Application No. 10161906, dated Feb. 15, 2013 (Feb. 15, 2013)".
"European Patent Office Final Decision dated Mar. 21, 2013", European Patent Application No. 10161906.2.
"European Search Report for European Application No. 09159949, 2 pages, dated Sep. 11, 2017 (Sep. 11, 2017)".
"European Search Report for European Application No. 09177128, 4 pages, dated Aug. 25, 2010 (Aug. 25, 2010)".
"European Search Report for European Application No. 10161906, 3 pages, dated Sep. 15, 2010 (Sep. 15, 2010)".
"European Search Report for European Application No. 10187320, 12 pages, dated Sep. 25, 2017 (Sep. 25, 2017)".
"European Search Report for European Application No. 11153607, 3 pages, dated Aug. 10, 2012 (Aug. 10, 2012))".
"European Search Report for European Application No. 11172553, 2 pages, dated Sep. 25, 2017 (Sep. 25, 2017)".
"European Search Report for European Application No. 11172612, 2 pages, dated Oct. 6, 2011 (Oct. 6, 2011))".
"European Search Report for European Application No. 11175126, 2 pages, dated Sep. 25, 2017 (Sep. 25, 2017)".
"European Search Report for European Application No. 11275170, 2 pages, dated Jan. 10, 2018 (Jan. 10, 2018)".
"European Search Report for European Application No. 12170370, 2 pages, dated Nov. 15, 2017 (Nov. 15, 2017)".
"European Search Report for European Application No. 12184150, 10 pages, dated Dec. 12, 2017 (Dec. 12, 2017)".
"European Search Report for European Application No. 13158034, 4 pages, dated Jun. 28, 2013 (Jun. 28, 2013))".
"European Search Report for European Application No. 13174817. 0, 13 pages, dated Jan. 8, 2018 (Jan. 8, 2018))".
"European Search Report for European Application No. 13189574, 2 pages, dated Feb. 19, 2014 (Feb. 19, 2014)".
"European Search Report for European Application No. 15167426, 4 pages, dated Sep. 18, 2015 (Sep. 18, 2015))".
"European Search Report for European Application No. 16167306, 2 pages, dated Mar. 23, 2017 (Mar. 23, 2017)".
"European Search Report for European Application No. 17154191, 2 pages, dated Jun. 28, 2017 (Jun. 28, 2017)".
"European Search Report for European Application No. 17188022, 9 pages, dated Feb. 1, 2018 (Feb. 1, 2018))".
"European Search Report and Written Opinion, European Patent Application No. 13165362.8", dated Sep. 24, 2014, 6 Pages.
"European Search Report for EP Application No. 18154672, 3 pages, dated Aug. 28, 2018 (Aug. 28, 2018))".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How To Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Thum, Notice of Opposition to a European Patent, EP App. No. 14189773.6, dated Dec. 13, 2018, 49 Pages.
Thum, "Oppostion Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.
EP Search Report for European Application No. 21173940.4, dated Nov. 12, 2021, 9 Pages.

\* cited by examiner

COMPRESSION ISOLATOR FOR A SUSPENSION DAMPER

CROSS-REFERENCE TO RELATED APPLICATIONS

This application is a continuation application of and claims the benefit of and claims priority to co-pending U.S. patent application Ser. No. 15/726,835, filed on Oct. 6, 2017, entitled "COMPRESSION ISOLATOR FOR A SUSPENSION DAMPER" by John Marking, assigned to the assignee of the present application, and is hereby incorporated by reference in its entirety.

The U.S. patent application Ser. No. 15/726,835 is a continuation application of and claims the benefit of and claims priority to U.S. patent application Ser. No. 15/180,250, filed on Jun. 13, 2016, now Issued U.S. Pat. No. 9,784,333, entitled "COMPRESSION ISOLATOR FOR A SUSPENSION DAMPER" by John Marking, assigned to the assignee of the present application, and is hereby incorporated by reference in its entirety.

The U.S. patent application Ser. No. 15/180,250 is a continuation application of and claims the benefit of and claims priority to U.S. patent application Ser. No. 14/692,401, filed on Apr. 21, 2015, now U.S. Pat. No. 9,366,307, entitled "COMPRESSION ISOLATOR FOR A SUSPENSION DAMPER" by John Marking, assigned to the assignee of the present application, and is hereby incorporated by reference in its entirety.

The U.S. patent application Ser. No. 14/692,401 is a continuation application of and claims the benefit of and claims priority to U.S. patent application Ser. No. 13/226,230, filed on Sep. 6, 2011, now U.S. Pat. No. 9,038,791, entitled "COMPRESSION ISOLATOR FOR A SUSPENSION DAMPER" by John Marking, assigned to the assignee of the present application, and is hereby incorporated by reference in its entirety.

The U.S. patent application Ser. No. 13/226,230 claims the benefit of and claims priority to the U.S. Provisional Patent Application No. 61/380,177 filed on Sep. 3, 2010, now expired, entitled "COMPRESSION ISOLATOR FOR A SUSPENSION DAMPER" by John Marking, assigned to the assignee of the present application, and is hereby incorporated by reference in its entirety.

The U.S. patent application Ser. No. 13/226,230 is also a continuation-in-part application of and claims the benefit of and claims priority to U.S. patent application Ser. No. 13/175,244, filed on Jul. 1, 2011, now U.S. Pat. No. 8,627,932, entitled "BYPASS FOR A SUSPENSION DAMPER" by John Marking, assigned to the assignee of the present application, and is hereby incorporated by reference in its entirety.

The U.S. Pat. No. 8,627,932 claims the benefit of and claims priority to the U.S. Provisional Patent Application No. 61/361,127 filed on Jul. 2, 2010, now expired, entitled "BYPASS LOCK-OUT VALVE FOR A SUSPENSION DAMPER" by John Marking, assigned to the assignee of the present application, and is hereby incorporated by reference in its entirety.

The U.S. patent application Ser. No. 13/226,230 is also a continuation-in-part application of and claims the benefit of and claims priority to U.S. patent application Ser. No. 13/010,697, filed on Jan. 20, 2011, now U.S. Pat. No. 8,857,580 entitled "REMOTELY OPERATED BYPASS FOR A SUSPENSION DAMPER" by John Marking, assigned to the assignee of the present application, and is hereby incorporated by reference in its entirety.

The U.S. Pat. No. 8,857,580 claims the benefit of and claims priority to the U.S. Provisional Patent Application No. 61/296,826 filed on Jan. 20, 2010, now expired, entitled "BYPASS LOCK-OUT VALVE FOR A SUSPENSION DAMPER" by John Marking, assigned to the assignee of the present application, and is hereby incorporated by reference in its entirety.

The U.S. patent application Ser. No. 13/226,230 is also a continuation-in-part application of and claims the benefit of and claims priority to U.S. patent application Ser. No. 12/684,072, filed on Jan. 7, 2010, now abandoned, entitled "REMOTELY OPERATED BYPASS FOR A SUSPENSION DAMPER" by John Marking, assigned to the assignee of the present application, and is hereby incorporated by reference in its entirety.

The U.S. patent application Ser. No. 12/684,072 claims the benefit of and claims priority to the U.S. Provisional Patent Application No. 61/143,152 filed on Jan. 7, 2009, now expired, entitled "REMOTE BYPASS LOCK-OUT" by John Marking, assigned to the assignee of the present application, and is hereby incorporated by reference in its entirety.

BACKGROUND OF THE INVENTION

Field of the Invention

Embodiments of the present invention generally relate to a suspension damper assembly for a vehicle. More specifically, the invention relates to a compression isolator for use with a vehicle damper.

Description of Related Art

Vehicle suspension systems typically include a spring component or components and a dampening component or components. Typically, mechanical springs, like helical springs are used with some type of viscous fluid-based dampening mechanism and the two are mounted functionally in parallel.

SUMMARY OF THE INVENTION

Embodiments herein generally comprise a fluid chamber having a piston dividing the chamber into a compression and rebound sides, a reservoir in fluid communication with the compression side of the chamber, and an isolator disposed in a fluid flow path between the compression side and the reservoir, whereby the isolator obstructs fluid flow between the compression side and the reservoir. In one embodiment, a bypass provides a fluid path between the compression side and the isolator.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments and are therefore not to be considered limiting of its scope, for the invention may admit to other equally effective embodiments.

DESCRIPTION OF EMBODIMENTS

Figure 1:
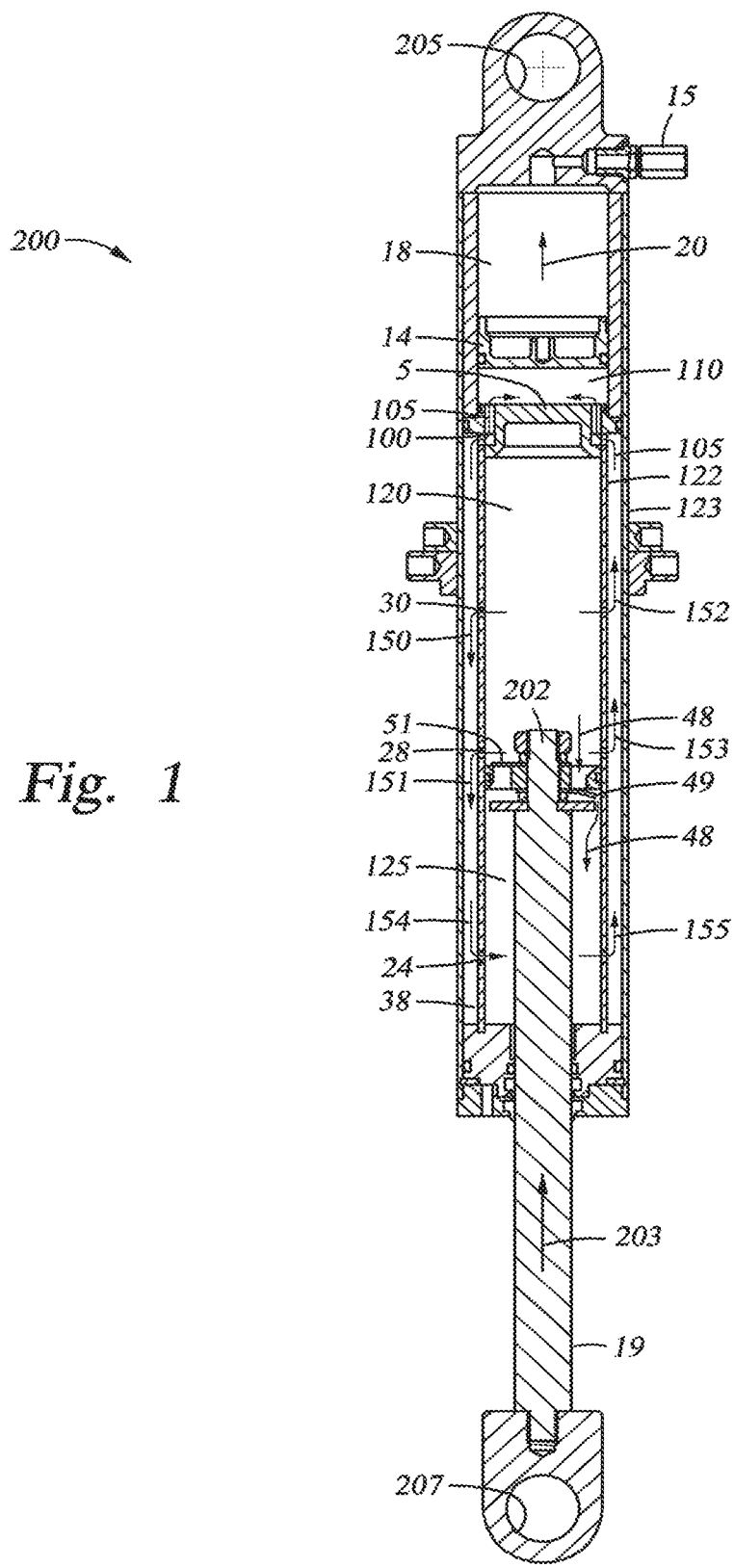
FIG. 1 is a section view of a damper with a piston in a first position within a chamber.

FIG. 1 is a section view of a damper 200 that is typically used in a vehicle suspension in order to control excessive movement of a spring (not shown). The damper 200 includes a fluid-filled chamber 122 having a piston 202 and rod 19 for reciprocation therein as the damper operates. At each end, the damper 200 is provided with mounting eyes 205, 207 for mounting to different parts of the vehicle. The piston 202 is equipped with shims 49, 51 that meter fluid through the piston 202 as it moves in a compression or rebound stroke in the cylinder. For example, in FIG. 1 the piston 202 is shown in a compression stroke as noted by rod 19 movement directional arrow 203. As it moves towards a far end (e.g. 205) of the cylinder, fluid travels from a compression side 120 to a rebound side 125 via shim 49 along a path 48. In a rebound stroke (not shown) shim 51 is utilized to meter fluid in an opposite direction through the piston 202.

In addition to the shimmed paths 49, 51 through the piston 202, fluid can travel between the compression 120 and rebound 125 sides of the chamber by utilizing an annular bypass 38 formed between the chamber 122 and an outer housing 123. While the bypass 38 utilizes an annular area and is co-axially disposed around the chamber 122 in the embodiment shown, it could comprise any number of designs so long as it provides an alternative fluid path between compression and rebound sides and around the piston 202. An internal bypass damper is shown and described in U.S. Pat. No. 6,296,092 which is entirely incorporated herein by reference. From the compression side 120 of the chamber, fluid may, in one embodiment, enter the bypass 38 through one of two ports 28, 30. On the rebound side, communication between the chamber and the bypass 38 is through port 24. The bypass 38 is a convenient way to provide "position sensitive" dampening. For example, on the compression side 120 of the chamber, the ports 28, 30 are axially spaced along the wall of the chamber. During a first portion of a compression stroke (shown in FIG. 1), both ports 28, 30 are open and a relatively large volume of fluid in the compression side 120 is free to utilize the bypass 38 to avoid the dampening effects of the piston shim 49. During a second portion of a compression stroke port 28 is closed by passage of the piston 202 and bypass fluid becomes limited to port 30 which results in increased compression damping.

At an end opposite the rod 19, the damper 200 includes a reservoir 110 for collecting fluid as the fluid capacity of the chamber decreases due to the volume of the encroaching piston rod 19 during a compression stroke. The reservoir 110 includes a floating piston 14 that acts to transfer pressure between damping fluid on one side and a gas pocket 18 on another side. As fluid enters the reservoir 110, the floating piston 14 moves (arrow 20) to compress the gas pocket and enlarge the volume of the reservoir 110 thereby compensating for the volume of the rod 19. In a rebound stroke of the piston 202, the reservoir returns fluid to the chamber 122 by operating in a reverse fashion (e.g. the pressurized gas pocket expands and damping fluid leaves the reservoir). A fill valve 15 permits access to the gas pocket, permitting the pressure in the pocket 18 to be adjusted based upon various conditions and preferences.

FIG. 1 also shows an embodiment of a compression isolator assembly 5. The isolator is constructed and arranged to prevent fluid from rapidly acting upon floating piston 14 of the reservoir 110. Without the isolator 5 a rapid or direct action of the compression damping fluid on the floating piston 14 can cause cavitation wherein a vacuum is created on the rebound side 125 of the chamber and the gas in the gas pocket essentially collapses, causing the damper to cease functioning properly. Cavitation is inhibited by the isolator 5 and an aperture 100 formed in the isolator 5 that adds additional dampening between the compression side and the reservoir in the event of a rapid movement of damping fluid towards the reservoir. Under normal circumstances, the isolator 5 does not create a noticeable effect on the dampening action of the damper. Rather, it is designed to operate only in high velocity compression events, such as a sudden terrain feature like a square edge bump, to prevent rapid compression from suddenly collapsing the nitrogen gas (or other compressible material) in pocket 18 due to a rapidly moving floating piston 14.

In one embodiment, the compression isolator 5 seals a far end of the chamber 122 between the compression side 120 and the floating piston 14 of the reservoir 110, and fluid communication between the chamber and the reservoir is limited to a fluid path 105 through aperture 100. As shaft 19 moves in a compression stroke, damping fluid from the compression side 120 is compressed against compression isolator 5 and thereby forced back through piston assembly shim 49 (along flow path 48) to rebound chamber 125. During such compression, additional fluid travels from chamber 120 to chamber 125 by exiting aperture 28 or 30, traveling in annular space 38 (along paths 150, 151) and entering chamber 125 via aperture 24 (along path 154). At the same time, fluid in chamber 125, that corresponds to the incurring volume of shaft 19, is displaced from chamber 125 and exits via aperture 24 (along path 155) into annular space 38 toward reservoir 110.

Figure 2:
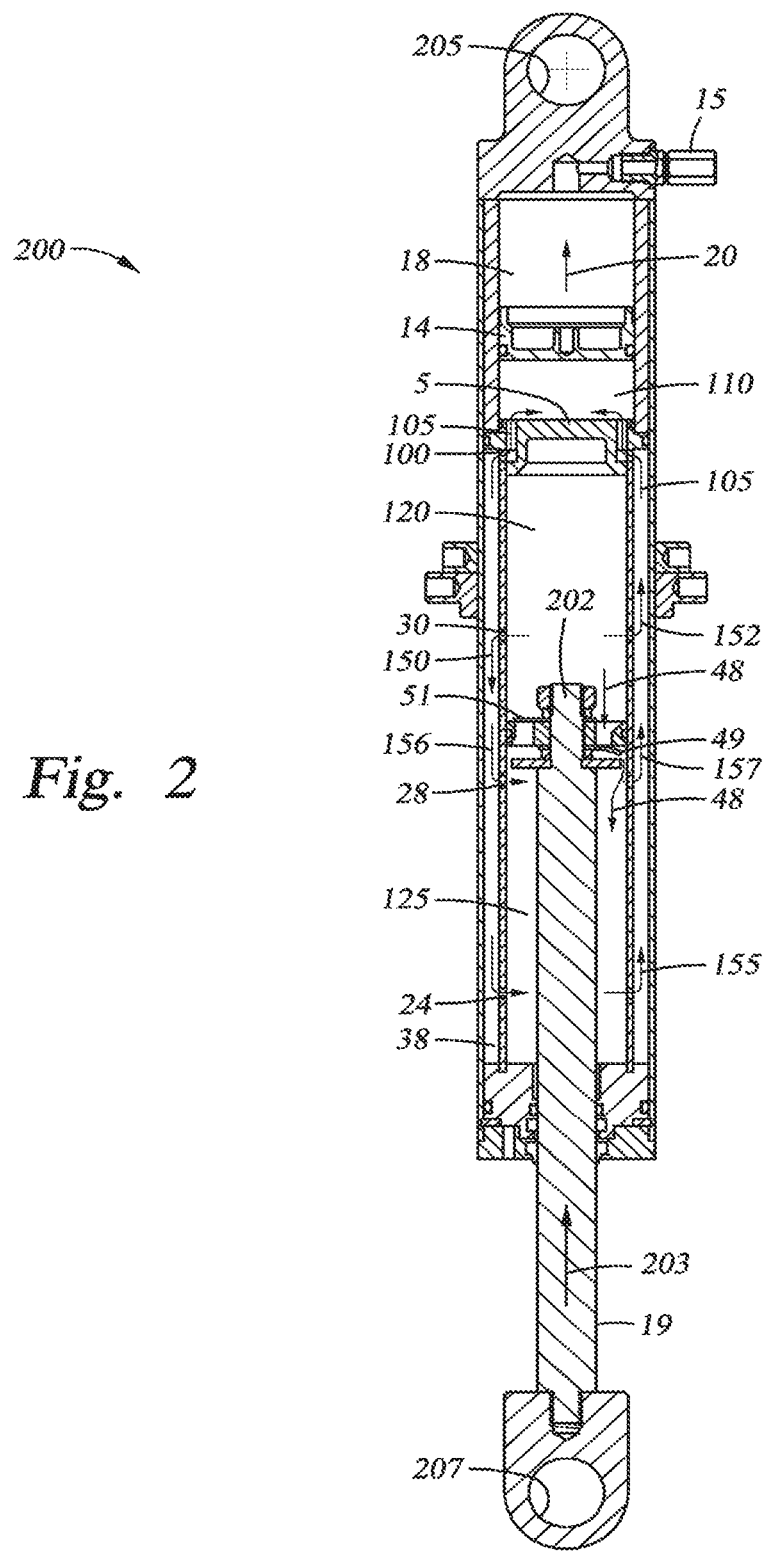
FIG. 2 is a section view of the damper of FIG. 1, with the piston in a second position.
Figure 3:
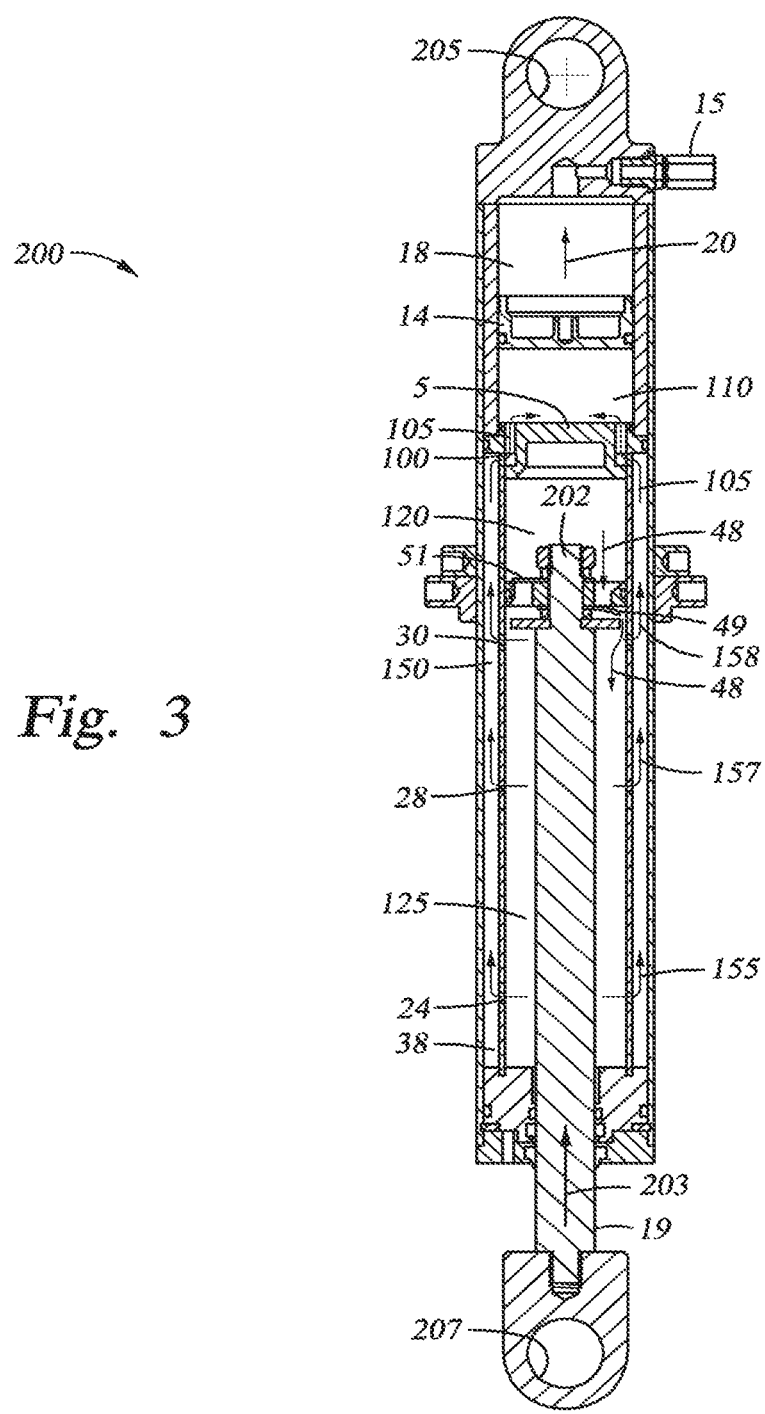
FIG. 3 is a section view of the damper of FIG. 1, with the piston in a third position.

FIGS. 1, 2 and 3 illustrate operation of the damper components at various stages in a compression stroke of the piston. In each stage, fluid utilizes a path 48 through piston shim 49. In FIG. 1, the piston is at an early stage in the stroke and both ports 28, 30 are exposed to the compression side 120 of the chamber and, as illustrated by directional arrows 150, 151 fluid is flowing to the rebound chamber utilizing bypass 38 with fluid entering port 24 shown by arrow 154. Also shown with directional arrows 152, 153, 155 is fluid flow from the compression side (152, 153) to the reservoir and from the rebound side (155) to the reservoir. The various (and sometimes opposing) arrows are simply used to illustrate the possible flow of the fluid in a dynamic system where flow direction is dependent upon a number of factors including the position of the piston in the chamber, the design of shim 49 in the piston 202, the sizes of the ports, and the characteristics of aperture 100 formed in the isolator 5.

As the piston 202 continues its movement towards the end of the chamber (as shown in FIG. 2) the piston passes port 28, effectively reducing by half the volume of fluid that can exit the compression side 120 into the bypass 38 and requiring that volume of fluid to pass through piston shim 49, along path 48. As shown in the Figure, port 28 is now open to the rebound side 125 of the chamber permitting fluid flow from the bypass to the rebound side 125 (along 156) and also permitting fluid to exit the rebound side 125 (along arrow 157) in the direction of the reservoir 110.

Finally, as shown in FIG. 3, the piston 202 has passed both ports 28 and 30 and the bypass is effectively closed to the entry of fluid from the compression side 120 of the chamber 122. Instead, all ports, 24, 28, and 30 serve to carry fluid from the rebound side 125 of the chamber to the reservoir 110 as is necessitated by the volume of the encroaching rod 19. Flow paths from each port towards the reservoir are shown with arrows 155, 157 and 158. Because the bypass is closed, dampening is increased as the piston moves closer to a "bottom-out" position at a far end of the chamber and fluid is increasingly forced through shim 49. FIGS. 1-3 illustrate an embodiment with a bypass 38 to provide position-sensitive damping along with cavitation protection provided by the compression isolator 5.

Figure 4:
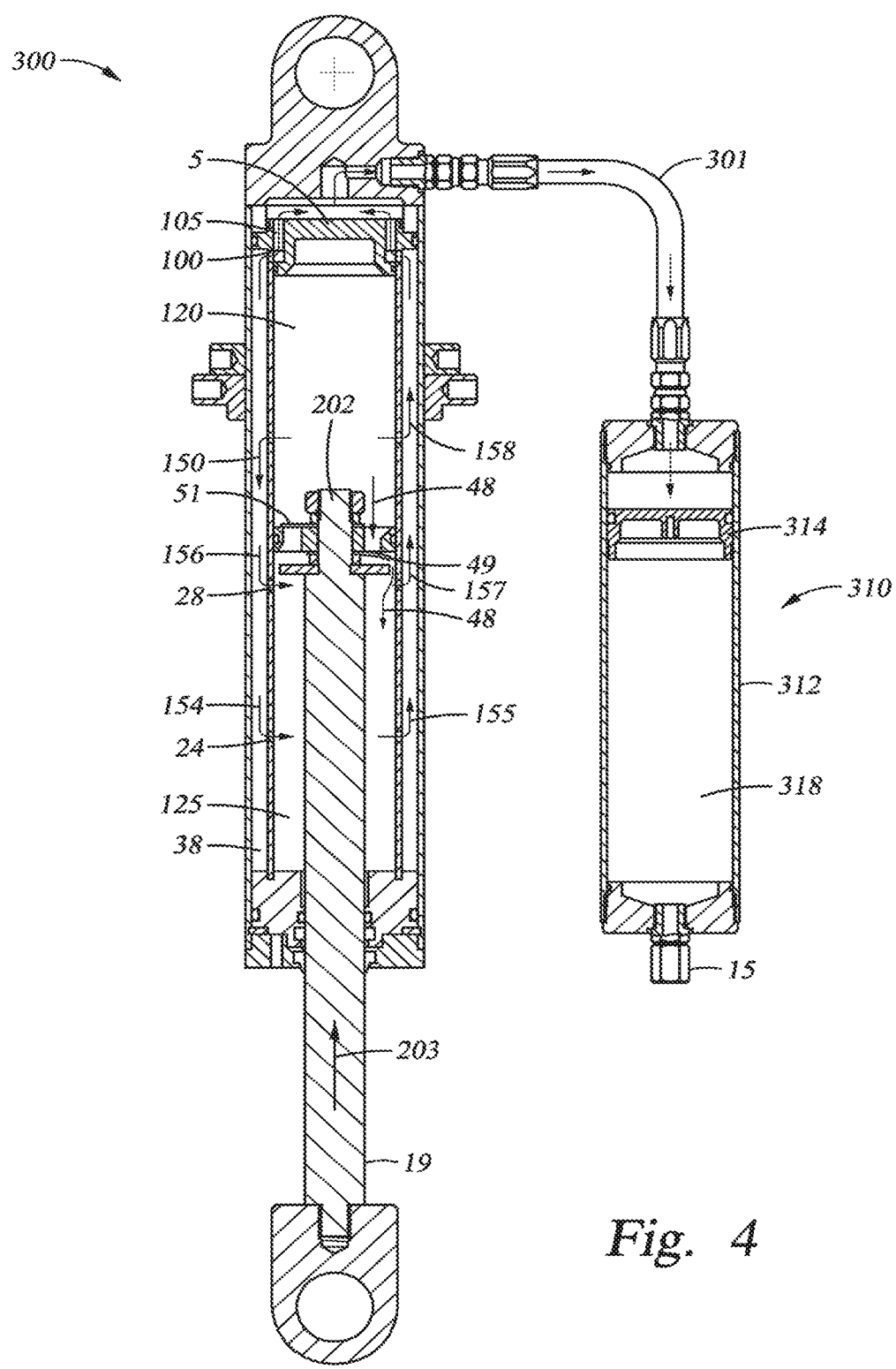
FIG. 4 is a section view of an alternative embodiment of a damper.

FIG. 4 is a section view of a damper 300 having a remote reservoir or "piggyback" 310. Like the embodiment of FIGS. 1-3, the damper includes an isolator 5 and an annular bypass 38 and includes axially disposed ports 24, 28, and 30 that permit varying amounts of fluid bypass depending upon the position of the piston 202 in the chamber 122. The primary difference in the embodiment of FIG. 4 is that the reservoir 310, floating piston 314 and gas pocket 318 are housed in a separate chamber 312 that is connected to the main damper with a fluid hose 301. In the damper of FIG. 4, the piston is shown partway through a compression stroke (as in FIG. 2) with aperture 28 on the rebound side of the piston and the various flow directions illustrated with arrows as in the previous figures. Specifically, fluid is exiting the compression side via port 30 and potentially migrating to both the rebound side (path 150) and to the reservoir (path 158). Concurrently, fluid is leaving the rebound side and traveling towards the reservoir along paths 155 and 157.

In one embodiment a simplified non-bypass type damper includes a compression isolator 5. In such embodiment (not shown) fluid travels, during a compression stroke, from the compression side of the piston to the rebound side of the piston only via flow such as along 48 through the piston. Fluid displaced by the incursion of rod 19 is pushed (along with pressure exerted due to compression of the compression side) toward the reservoir and floating piston. In such embodiment, the isolator 5 may have an aperture (in lieu of aperture 100 as shown in the Figures) or apertures located near or about a center of the isolator 5 and sized to allow normal damping flow but to restrict sudden large volume flow that may cause cavitation. It will be understood that the isolator can be used without a bypass by simply utilizing a metering device at an end of the chamber opposite the piston rod.

While the foregoing is directed to embodiments of the present invention, other and further embodiments of the invention may be devised without departing from the basic scope thereof, and the scope thereof. For example, the invention is shown in the embodiments as including a bypass that operates with the compression isolator. Similarly, the location and design of the reservoir is variable, as shown in the disclosed embodiments. Such variations are within the scope of the invention and the claims that follow.

What is claimed is:

1. A vehicle suspension damper comprising:
   a fluid chamber housing, said fluid chamber housing defining a fluid chamber therein, said fluid chamber comprising:
       a compression side; and
       a rebound side;
   a piston disposed within said fluid chamber, said piston dividing said fluid chamber into said compression side and said rebound side, said piston having a shimmed compression pathway extending through said piston to enable fluid communication between said compression side and said rebound side, said piston having a shimmed rebound pathway extending through said piston to enable fluid communication between said compression side and said rebound side;
   a compression isolator disposed within said fluid chamber, said compression isolator disposed at a location which inhibits a fluid from causing movement of a floating piston, said compression isolator further comprising:
       a partition located within said compression side of said fluid chamber between said piston and said floating piston; and
       an aperture formed through said partition, said aperture having a configuration such that said compression isolator inhibits cavitation during rapid movement events, said compression isolator configured to force said fluid back through said piston via said shimmed rebound pathway during a compression stroke of said piston;
   a reservoir chamber reservoir chamber fluidically coupled with said fluid chamber, said reservoir chamber comprising:
       a fluid-fillable portion, said fluid-fillable portion configured to receive said fluid from said fluid chamber as a fluid capacity of said fluid chamber decreases during said compression stroke;
       a compressible pocket; and
       said floating piston disposed within said reservoir chamber, said floating piston movably sealing said fluid-fillable portion from said compressible pocket, said floating piston configured to transfer force between fluid in said fluid-fillable portion of said fluid reservoir and said compressible pocket; and
   a bypass chamber providing a fluid pathway between said compression side and said rebound side, said bypass chamber being in fluid communication with said fluid chamber via a set of ports disposed in a wall of said fluid chamber housing.

2. The vehicle suspension damper of claim 1, wherein fluid flow through said bypass chamber is reduced as said piston moves in said compression stroke.

3. The vehicle suspension damper of claim 1, comprising:
   at least three ports comprising said set of ports, said at least three ports formed through said wall of said fluid chamber housing and permitting fluid communication between said fluid chamber and said bypass chamber, said at least three ports axially spaced along said wall of said fluid chamber housing such that when said piston is in a first position, said at least three ports are between said piston and said compression isolator, and when said piston is in a second position, at least two of said at least three ports are between said piston and said compression isolator.

4. The vehicle suspension damper of claim 3 wherein when said piston is in a third position, none of said at least three ports are between said piston and said compression isolator.

5. The vehicle suspension damper of claim 4, wherein when said piston is in said first position and also when said piston is in said second position, said fluid communicates between said bypass chamber, said fluid-fillable portion of said reservoir chamber, said rebound side of said fluid chamber and said compression side of said fluid chamber, but when said piston is in said third position, said fluid communicates only between said bypass chamber, said fluid-fillable portion of said reservoir chamber and said rebound side of said fluid chamber.

6. A vehicle suspension comprising:
a fluid chamber housing, said fluid chamber housing defining a fluid chamber therein, said fluid chamber comprising:
a compression side; and
a rebound side;
a piston disposed within said fluid chamber, said piston dividing said fluid chamber into said compression side and said rebound side, said piston having a shimmed compression pathway extending through said piston to enable fluid communication between said compression side and said rebound side, said piston having a shimmed rebound pathway extending through said piston to enable fluid communication between said compression side and said rebound side;
a bypass chamber providing a fluid pathway between said compression side and said rebound side of said fluid chamber, said bypass chamber substantially co-axially disposed about an outer surface of a wall of said fluid chamber housing and being in fluid communication with said fluid chamber via a set of ports disposed in said wall of said fluid chamber housing;
a reservoir chamber fluidically coupled with said fluid chamber, said reservoir chamber comprising:
a fluid-fillable portion, said fluid-fillable portion configured to receive fluid from said fluid chamber;
a gas pocket; and
a floating piston disposed between and movably sealing said fluid-fillable portion and said gas pocket, said floating piston configured to transfer pressure between said fluid-fillable portion and said gas pocket; and
a compression isolator disposed within said fluid chamber between said compression side and said fluid-fillable portion of said reservoir chamber, said compression isolator further comprising:
a partition located between said piston and said floating piston; and
an aperture formed through said partition, said aperture restricting fluid flow through said partition such that said partition inhibits cavitation during rapid movement events, and under normal circumstances does not create a noticeable effect on a dampening action of said damper said compression isolator configured to force said fluid back through said piston via said shimmed rebound pathway during a compression stroke of said piston.

7. The vehicle suspension of claim 6, wherein fluid flow through said bypass chamber is reduced as said piston moves in said compression stroke.

8. The vehicle suspension of claim 6, comprising:
at least three ports comprising said set of ports, said at least three ports formed through said wall of said fluid chamber housing and permitting fluid communication between said fluid chamber and said bypass chamber, said at least three ports axially spaced along said wall of said fluid chamber housing such that when said piston is in a first position, said at least three ports are between said piston and said compression isolator, and when said piston is in a second position, at least two of said at least three ports are between said piston and said compression isolator.

9. The vehicle suspension of claim 8 wherein when said piston is in a third position, none of said at least three ports are between said piston and said compression isolator.

10. The vehicle suspension of claim 9, wherein when said piston is in said first position and also when said piston is in said second position, said fluid communicates between said bypass chamber, said fluid-fillable portion of said reservoir chamber, said rebound side of said fluid chamber and said compression side of said fluid chamber, but when said piston is in said third position, said fluid communicates only between said bypass chamber, said fluid-fillable portion of said reservoir chamber and said rebound side of said fluid chamber.

11. A vehicle suspension comprising:
a fluid chamber housing, said fluid chamber housing defining a fluid chamber therein, said fluid chamber comprising:
a compression side; and
a rebound side;
a piston disposed within said fluid chamber, said piston dividing said fluid chamber into said compression side and said rebound side, said piston having a shimmed compression pathway extending through said piston to enable fluid communication between said compression side and said rebound side, said piston having a shimmed rebound pathway extending through said piston to enable fluid communication between said compression side and said rebound side;
a bypass chamber providing a fluid pathway between said compression side and said rebound side of said fluid chamber;
a reservoir chamber disposed within said fluid chamber housing, said reservoir chamber fluidically coupled with said fluid chamber, said reservoir chamber comprising:
a fluid-fillable portion, said fluid-fillable portion configured to receive fluid from said fluid chamber;
a gas pocket; and
a floating piston disposed between and movably sealing said fluid-fillable portion and said gas pocket, said floating piston configured to transfer pressure between said fluid-fillable portion and said gas pocket; and
a compression isolator disposed within said fluid chamber between said compression side of said fluid chamber and said fluid-fillable portion of said reservoir chamber, said compression isolator reducing the rate at which said fluid acts upon said floating piston, said compression isolator inhibits cavitation during rapid movement events, said compression isolator configured to force said fluid back through said piston via said shimmed rebound pathway during a compression stroke of said piston, said compression isolator further comprising:
a partition fixedly located within said compression side of said fluid chamber between said piston and said floating piston; and
an aperture formed through said partition, said aperture enabling said fluid to flow through said partition.

12. The vehicle suspension of claim 11 further comprising:
a set of ports disposed in said wall of said fluid chamber housing, said bypass chamber in fluid communication with said fluid chamber via said set of ports.

13. The vehicle suspension of claim 11 further comprising:
a fill valve coupled to said gas pocket, said fill valve configured to permit access to said gas pocket such that a pressure in said gas pocket is adjustable.

14. The vehicle suspension of claim 11 wherein said bypass chamber provides position-sensitive damping for said vehicle suspension.

15. The vehicle suspension of claim 11 wherein said compression isolator provides cavitation protection for said vehicle suspension.

16. The vehicle suspension of claim 11 wherein said bypass chamber and said compression isolator respectively provide position-sensitive damping and cavitation protection for said vehicle suspension.

17. The vehicle suspension of claim 11, wherein fluid flow through said bypass chamber is reduced as said piston moves further into said fluid chamber housing during said compression stroke such that dampening of said vehicle suspension is increased as said piston moves closer to a bottom-out position.

18. The vehicle suspension of claim 11, comprising:
at least three ports formed through a wall of said fluid chamber housing and permitting fluid communication between said fluid chamber and said bypass chamber, said at least three ports axially spaced along said wall of said fluid chamber housing such that when said piston is in a first position, said at least three ports are between said piston and said compression isolator, and when said piston is in a second position, at least two of said at least three ports are between said piston and said compression isolator.

19. The vehicle suspension of claim 18 wherein when said piston is in a third position, none of said at least three ports are between said piston and said compression isolator.

20. The vehicle suspension of claim 18, wherein when said piston is in said first position and also when said piston is in said second position, said bypass chamber provides fluid communication between said rebound side of said fluid chamber and said compression side of said fluid chamber, but when said piston is in said third position, fluid communication between said rebound side of said fluid chamber and said compression side of said fluid chamber through said bypass chamber is prevented.

* * * * *